United States Patent
Cluet et al.

(10) Patent No.: US 11,718,213 B2
(45) Date of Patent: Aug. 8, 2023

(54) ASSEMBLY FOR A VEHICLE SEAT

(71) Applicant: Faurecia Sièges d'Automobile, Nanterre (FR)

(72) Inventors: Mathieu Cluet, Etampes (FR); Jérôme Planson, Angerville (FR); Fabrice Charras, Montrouge (FR); Vincent Leguernic, Etrechy (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 17/578,409

(22) Filed: Jan. 18, 2022

(65) Prior Publication Data
US 2022/0227276 A1 Jul. 21, 2022

(30) Foreign Application Priority Data

Jan. 18, 2021 (FR) ................ FR 21 00441

(51) Int. Cl.
*B60N 2/70* (2006.01)
*B60N 2/72* (2006.01)
*B60R 16/02* (2006.01)

(52) U.S. Cl.
CPC ............ *B60N 2/7094* (2013.01); *B60N 2/72* (2013.01); *B60R 16/0215* (2013.01)

(58) Field of Classification Search
CPC ...... B60N 2/7094; B60N 2/72; B60N 2/7035; B60R 16/0215; H01R 13/73
USPC .................................................. 297/452.48
See application file for complete search history.

(56) References Cited

U.S. PATENT DOCUMENTS 10,086,727 B1 * 10/2018 Ruff ..................... B60N 2/70
2007/0102594 A1 5/2007 Geiger et al.
2011/0109133 A1 5/2011 Galbreath et al.

FOREIGN PATENT DOCUMENTS

CN 203601044 * 5/2014
WO 2010014110 A1 2/2010

OTHER PUBLICATIONS

French Search Report corresponding to French Application No. FR 2100441, dated Sep. 27, 2021, 2 pages.

* cited by examiner

*Primary Examiner* — Mark R Wendell
(74) *Attorney, Agent, or Firm* — Reising Ethington P.C.

(57) ABSTRACT

An assembly for a vehicle seat that includes: a padding element, a support element, and a connector attached to the support element, with the support element assembled on the padding element. The assembly has an assembly member extending from a surface of the padding element, or formed by at least a portion of the support element, with the connector and the padding element each defining a first contact surface and a second contact surface, respectively, in contact with the first contact surface. The first contact surface and the second contact surface are substantially complementary, with the support element being assembled on the padding element by means of the assembly member, in an assembly direction.

20 Claims, 3 Drawing Sheets

ASSEMBLY FOR A VEHICLE SEAT

CROSS-REFERENCE TO RELATED APPLICATION

This application claims the benefit of French Patent Application No. FR 21 00441 filed on Jan. 18, 2021, which is hereby incorporated by reference.

TECHNICAL FIELD

According to a first aspect, the present invention relates to an assembly for a vehicle seat comprising a seat padding element, a support element, a connector attached to the support element, the support element being assembled on the padding element.

According to a second aspect, the invention also relates to a vehicle seat comprising such a seat assembly and, according to a third aspect, to a method for assembling such a seat assembly.

BACKGROUND

The connector allows the electrical wiring harness of the seat to be connected to the electrical wiring harness of the vehicle. Fixing this connector to a metal plate, which is itself fixed to the seat structure by screwing, bolting or welding, is known.

This involves a number of disadvantages, as the connector assembly on the seat is time-consuming, involves the use of many components and tools, and makes the assembly more cumbersome.

SUMMARY

One objective of the invention is to overcome these disadvantages by providing a lighter, less expensive assembly for a vehicle seat that makes it possible to facilitate the connector assembly while limiting the number of parts and tools required and thus reduce the assembly time and limit carbon dioxide emissions.

To this end, the invention relates to an assembly for a vehicle seat of the aforesaid type comprising an assembly member, the assembly member protruding from a surface of the padding element or being formed by at least a portion of the padding element, the assembly member and the padding element each defining a respectively first and second contact surface, in contact with the first contact surface, the first and second contact surfaces being substantially complementary, the support element being assembled by means of the assembly member on the padding element along an assembly direction.

As such, the assembly makes a simplified assembly of the connector on the seat possible by assembling the support element on the padding element. The assembly of the connector on the seat requires few parts and does not require any specific tool. In particular, the assembly does not require any welding, screwing or bolting steps. The absence of an intermediate element for fixing the connector to the seat, such as a metal plate, also reduces the mass of the assembly. The connector can also be easily disassembled from the seat without the need for tools.

According to different embodiments, the assembly further comprises one or more of the following features, taken alone or in any technically possible combination:

- the padding element defines a abutment surface for the support element;
- the padding element is a backrest padding element or a sitting padding element;
- the assembly member is formed by a tenon protruding from the surface of the padding element, the tenon and the padding element being a single piece, the support element being assembled on the tenon in the assembly direction;
- the support element defines a groove, with an inner surface of the groove defining the second contact surface;
- the padding element and the tenon are made of expanded polypropylene or rigid polyurethane;
- a section of the tenon in a transverse direction substantially perpendicular to the assembly direction is a substantially trapezoid or half-moon section;
- the tenon section in the transverse direction is a substantially trapezoid section, the support element comprising two holding tabs arranged opposite each other, an inner surface of the holding tabs forming at least in part the second contact surface.

The invention also relates to a vehicle seat comprising an assembly as described above.

Finally, the invention relates to a method for assembling an assembly as described above, the method comprising insertion by translation along the assembly direction of the support element on the padding member by means of the assembly member.

BRIEF DESCRIPTION OF THE DRAWINGS

Other aspects and advantages of the invention will become apparent from the following description, given by way of example and made with reference to the appended drawings, among which

DETAILED DESCRIPTION OF EMBODIMENTS

Figure 1:
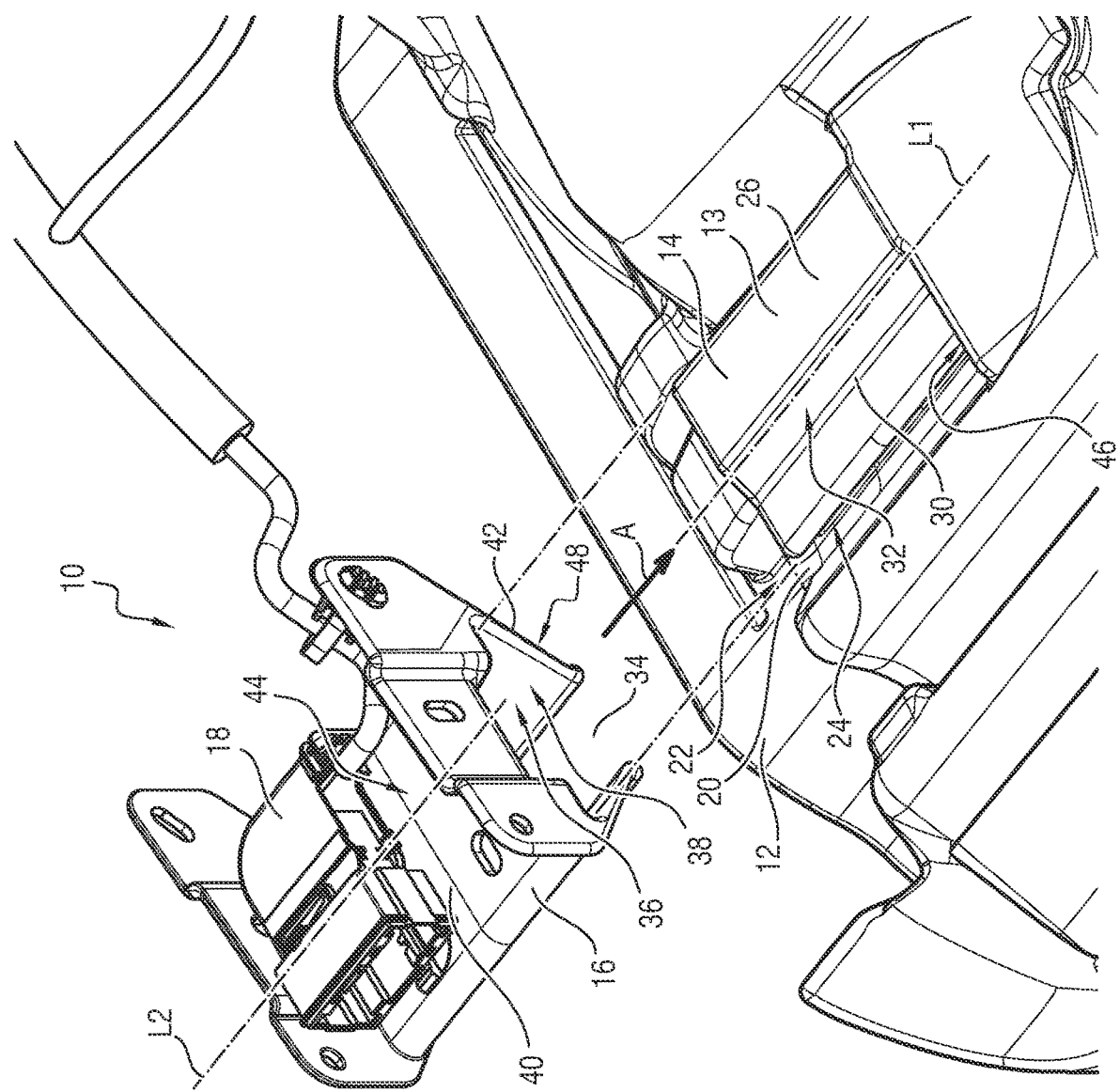
FIGS. 1 to 3 are perspective views of an assembly for a vehicle seat according to a first embodiment of the invention from three angles of view.
Figure 2:
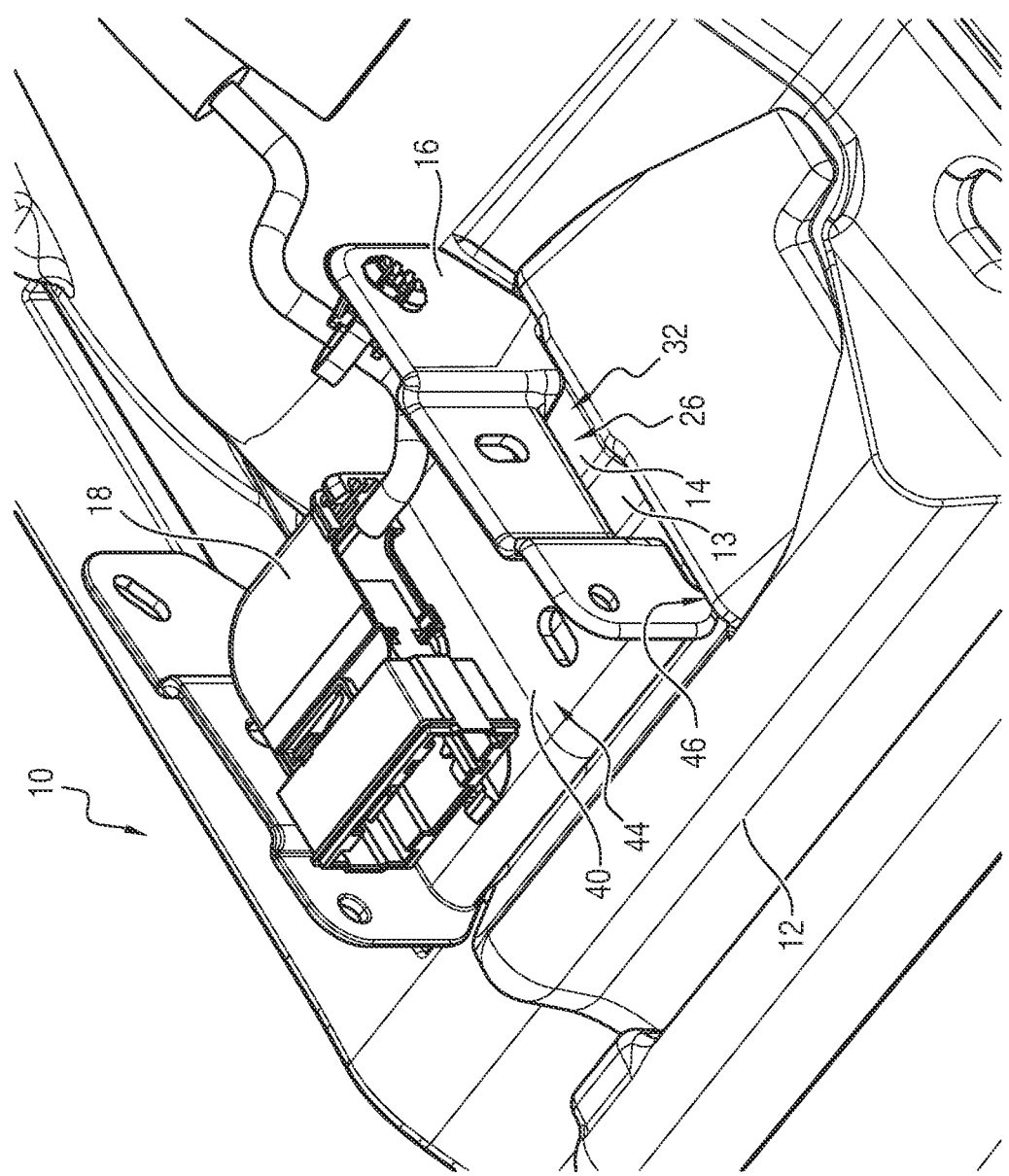
Figure 3:
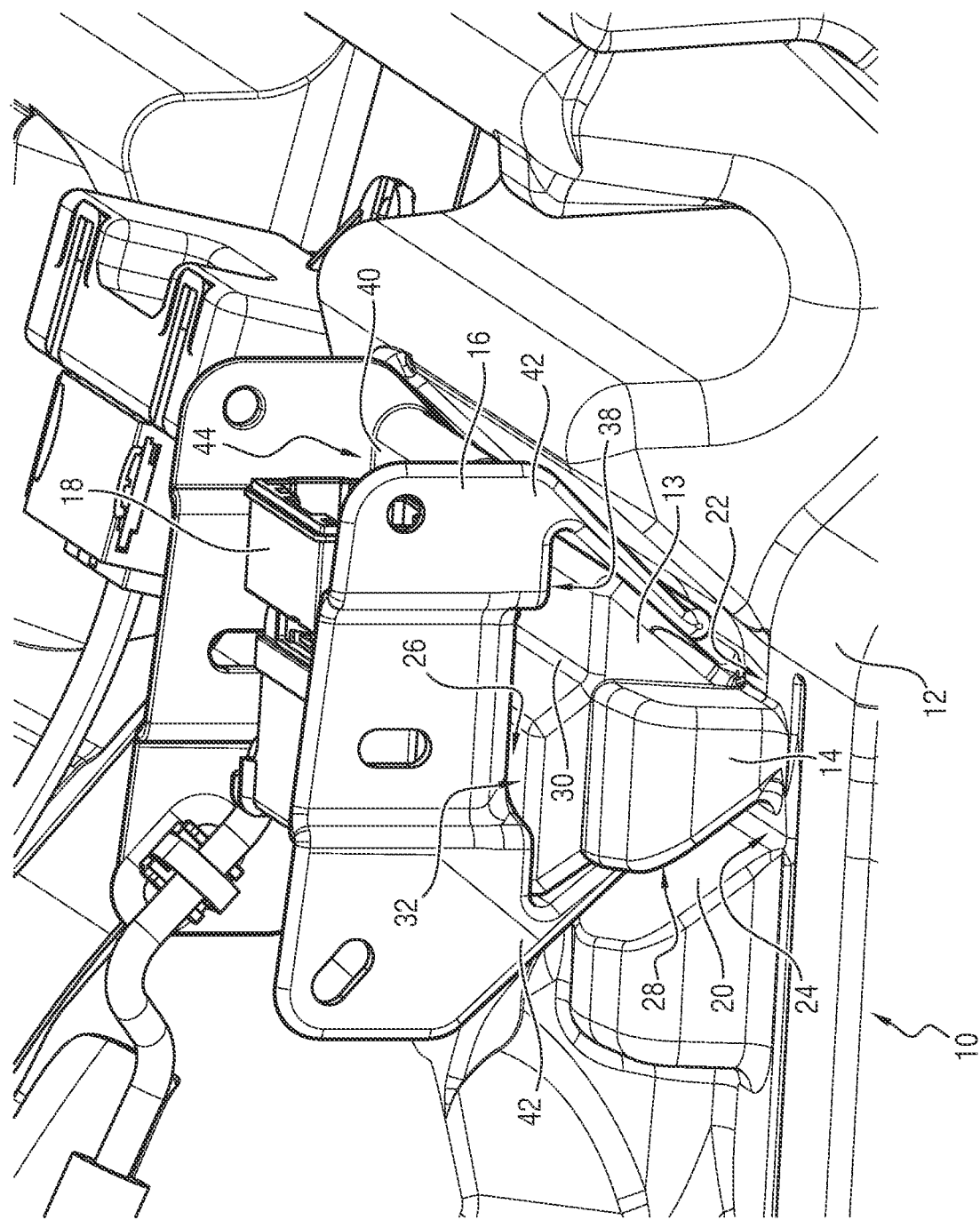

FIGS. 1 through 3 show an assembly for a vehicle seat 10 according to an embodiment of the invention.

The vehicle (not shown) is a passenger vehicle (or passenger car) or a commercial vehicle, for example, such as a van, pickup truck or the like.

In a variant, the vehicle is a vehicle of any type, such as an airplane, boat, railroad vehicle, etc.

In the example of FIGS. 1 to 3, the seat is a driver's seat or a passenger seat of a motor vehicle, for example.

The assembly 10 comprises a padding element 12, an assembly member 13, a support element 16 assembled on the padding element 12 in an assembly direction A, and a connector 18.

The padding element 12 is a seat or seat back padding element, for example. The padding element 12 is typically mounted on a seat frame (not shown).

Preferably, the padding element 12 is made of foam, such as expanded polypropylene or rigid polyurethane.

In the embodiment of FIGS. 1 to 3, the assembly member 13 is formed by a tenon 14 protruding from a surface 22 of the padding element 12.

The padding element 12 defines an interior housing 20 receiving the tenon 14, for example.

The tenon 14 extends primarily in a first main extension direction L1, substantially parallel to the assembly direction A.

Advantageously, the tenon 14 and the padding element 12 are integral.

In a variant, the tenon 14 is an attached element fixed to the padding element 12 by screwing or gluing, for example.

The tenon 14 protrudes from a surface 22 of the padding element 12, and more particularly, in the example of FIGS. 1 to 3, from a lower surface 24 of the interior housing 20. For example, the tenon 14 protrudes from a lower surface of the padding element 12. The lower surface means the surface that faces the vehicle floor when the padding element 12 is mounted on the seat frame.

For example, a section of the tenon 14 in a transverse direction substantially perpendicular to the assembly direction A is substantially trapezoidal.

More particularly, the tenon 14 includes a top wall 26 extending at least in part in a first plane substantially parallel to the lower surface 24 of the interior housing 20, and two side walls 28, each extending in a respective second and third plane.

In the example of FIGS. 1 to 3, the top wall 26 defines a groove 30 for receiving a lower portion of the connector 18 projecting toward the top wall 26 of the tenon 14.

The side walls 28 are arranged on either side of the top wall 26 and are assembled to the top wall 26 and to the surface 22 of the padding element 12, and more particularly to the lower surface 24 of the interior housing 20.

The second and third plane form an angle with the first plane of between 30° and 60°, such as 45°.

The tenon 14 defines a first contact surface 32 (FIG. 1).

The first contact surface 32 is formed by at least a portion of the sidewalls 28 and/or at least a portion of the top wall 26 of the tenon 14, for example.

The connector 18 is preferably an electrical connector.

The connector 18 is attached to the support element 16. For example, the connector 18 is attached to the support element 16 by gluing, snapping or screwing.

The support element 16 extends primarily along a second main extension direction L2 substantially parallel to the assembly direction A when the support element 16 is assembled to the tenon 14 and substantially parallel with the first main extension direction L1 of the tenon 14.

The support element 16 defines a groove 34 including an inner surface 36. The inner surface 36 of the groove 34 defines a second contact surface 38 (FIG. 1).

More particularly, the support element 16 comprises a top wall 40 and two retaining tabs 42 assembled to the top wall 40, arranged opposite each other, and arranged on opposite sides of the top wall 40 (FIGS. 1 and 3). The top wall 40 of the support element 16 defines a receiving surface 44 of the connector 18.

The second contact surface 38 is, for example, formed by at least a portion of the inner surface of the retaining tabs 42 and/or at least a portion of the top wall 40 of the support element 16.

The first contact surface 32 of the tenon 14 and the second contact surface 38 of the support element 16 contact each other when the support element 16 is assembled on the tenon 14. The first contact surface 32 and the second contact surface 38 are substantially complementary.

In the example of FIGS. 1 through 3, the tenon 14 and the support element 16 are attached by a mechanical dovetail connection.

Preferably, the retaining tabs 42 can warp flexibly in a direction substantially perpendicular to the second main extension direction L2 of the support element 16. "Warp flexibly" means that the retaining tabs 42 warp, i.e. move toward each other when pressure is exerted on said retaining tabs 42 or, conversely, move away from each other when traction is exerted on said retaining tabs 42. The retaining tabs 42 return to their non-warped equilibrium position when pressure or traction is no longer applied to the retaining tabs 42.

For example, the retaining tabs 42 are in a warped state when the support element 16 is assembled on the tenon 14 such that the retaining tabs 42 exert a bearing force on at least a portion of the first bearing surface 32 of the tenon 14. Conversely, the retaining tabs 42 are not in a warped state when the support element 16 is away from the tenon 14.

This ensures that the support element 16 is securely held on the tenon 14.

Preferably, the padding element 12 defines an abutment surface 46 (FIGS. 1 and 2) that receives a side surface 48 of the support element 16 in abutment, at least in part, for example a side surface of the retaining tabs 42. The abutment surface 46 extends in a plane substantially perpendicular to the first main extension direction L1 of the tenon 14 and substantially perpendicular to the assembly direction A, for example.

In the example of FIGS. 1 to 3, the abutment surface 46 is formed by an inner surface of the interior housing 20.

A method for assembling an assembly 10 as described above will now be described.

The method first comprises attaching the connector 18 to the support element 16.

The support element 16 is then assembled to the tenon 14 by insertion along the assembly direction A such that the first contact surface 32 of the tenon 14 and the second surface 38 of the support element 18 abut each other.

Preferably, the support element 16 is inserted onto the tenon 14 until the side wall of the support element 16 abuts the abutment surface 46.

The disassembly is accomplished by exerting traction on the support element 16 in a disassembly direction substantially opposite to the assembly direction A.

According to a second embodiment (not shown), the section of the tenon 14 in the transverse direction is a half-moon section. The first contact surface 32 then defines a convex curved surface.

The second contact surface 38 then defines a concave curved surface substantially complementary to the first contact surface 32.

In a variant (not shown), the assembly member 13 is formed by at least a portion of the support element 16. Preferably, the assembly member 13 is formed by a polyhedron, such as expanded foam or rigid polyurethane.

The padding element 12 then comprises a groove receiving the assembly member 13.

The groove is preferably defined by the surface 22 of the padding element 12. In a variant, the groove is formed by means of an element brought onto the surface 22 of the padding element 12.

The invention claimed is:

1. An assembly for a vehicle seat, the assembly comprising:
   a seat padding element,
   a support element, and
   a connector attached to the support element, the support element being assembled on the padding element,
   wherein the assembly comprises an assembly member,
   the assembly member protruding from a surface of the padding element, or being formed by at least a portion of the support element,
   the assembly member and the support element each defining a first contact surface and a second contact surface, respectively, in contact with each other, the first contact surface and the second contact surface being complementary, the support element being assembled by the assembly member to the padding element along an assembly direction, wherein the assembly member is formed by a tenon protruding from the surface of the padding element, the tenon and the padding element being one piece, the support element being assembled to the tenon in the assembly direction, and wherein the support element defines a groove, an inner surface of the groove defining the second contact surface.

2. The assembly according to claim 1, wherein the padding element defines an abutment surface for the support element.

3. The assembly according to claim 1, wherein the padding element is a backrest padding element or a sitting padding element.

4. The assembly according to claim 1, wherein the padding member and the tenon are made of expanded polypropylene or rigid polyurethane.

5. The assembly according to claim 1, wherein a section of the tenon in a transverse direction perpendicular to the assembly direction is a trapezoid or half-moon section.

6. The assembly according to claim 5, wherein a cross-section of the tenon in the transverse direction is a trapezoid cross-section, the support element comprising two retaining tabs arranged opposite each other, an inner surface of the retaining tabs at least partially forming the second contact surface.

7. A vehicle seat comprising the assembly according to claim 1.

8. A method of assembling a vehicle seat assembly, with the assembly being according to claim 1, the method comprising the insertion by translation in the assembly direction of the support element on the padding element via the assembly member.

9. An assembly for a vehicle seat, the assembly comprising:
   a seat padding element,
   a support element, and
   a connector attached to the support element, the support element being assembled on the padding element,
   wherein the assembly comprises an assembly member,
   the assembly member protruding from a surface of the padding element, or being formed by at least a portion of the support element,
   the assembly member and the support element each defining a first contact surface and a second contact surface, respectively, in contact with each other, the first contact surface and the second contact surface being complementary,
   the support element being assembled by the assembly member to the padding element along an assembly direction,
   wherein the assembly member is formed by a tenon protruding from the surface of the padding element, the tenon and the padding element being one piece, the support element being assembled to the tenon in the assembly direction, and
   wherein a section of the tenon in a transverse direction perpendicular to the assembly direction is a trapezoid section.

10. The assembly according to claim 9, wherein the padding element defines an abutment surface for the support element.

11. The assembly according to claim 9, wherein the padding element is a backrest padding element or a sitting padding element.

12. The assembly according to claim 9, wherein the padding member and the tenon are made of expanded polypropylene or rigid polyurethane.

13. The assembly according to claim 9, wherein the support element comprises two retaining tabs arranged opposite each other, an inner surface of the retaining tabs at least partially forming the second contact surface.

14. A vehicle seat comprising the assembly according to claim 9.

15. A method of assembling a vehicle seat assembly, with the assembly being according to claim 9, the method comprising the insertion by translation in the assembly direction of the support element on the padding element via the assembly member.

16. An assembly for a vehicle seat, the assembly comprising:
   a seat padding element,
   a support element, and
   a connector attached to the support element, the support element being assembled on the padding element,
   wherein the assembly comprises an assembly member,
   the assembly member protruding from a surface of the padding element, or being formed by at least a portion of the support element,
   the assembly member and the support element each defining a first contact surface and a second contact surface, respectively, in contact with each other, the first contact surface and the second contact surface being complementary,
   the support element being assembled by the assembly member to the padding element along an assembly direction,
   wherein the assembly member is formed by a tenon protruding from the surface of the padding element, the tenon and the padding element being one piece, the support element being assembled to the tenon in the assembly direction, and
   wherein a section of the tenon in a transverse direction perpendicular to the assembly direction is a half-moon section.

17. The assembly according to claim 16, wherein the padding element defines an abutment surface for the support element.

18. The assembly according to claim 16, wherein the padding element is a backrest padding element or a sitting padding element.

19. The assembly according to claim 16, wherein the padding member and the tenon are made of expanded polypropylene or rigid polyurethane.

20. A vehicle seat comprising the assembly according to claim 1.

* * * * *